United States Patent
Squibbs et al.

(10) Patent No.: US 7,734,446 B2
(45) Date of Patent: Jun. 8, 2010

(54) PHYSICAL OBJECT WITH MEMORY TAG AND APPARATUS FOR USE WITH SUCH OBJECTS

(75) Inventors: Robert Francis Squibbs, Bristol (GB); James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 56 days.

(21) Appl. No.: 11/035,814

(22) Filed: Jan. 14, 2005

(65) Prior Publication Data

US 2005/0171739 A1 Aug. 4, 2005

(30) Foreign Application Priority Data

Jan. 30, 2004 (GB) .................. 0402025.1

(51) Int. Cl.
*G06F 15/00* (2006.01)
(52) U.S. Cl. .................................... 702/189
(58) Field of Classification Search ........... 702/189; 340/10.41, 572, 10.4
See application file for complete search history.

(56) References Cited

U.S. PATENT DOCUMENTS

| | | | | |
|---|---|---|---|---|
| 4,476,468 | A | | 10/1984 | Goldman ............. 340/999.999 |
| 4,630,845 | A | * | 12/1986 | Sanner ......................... 283/91 |
| 4,663,612 | A | * | 5/1987 | Mejia et al. .............. 340/572.4 |
| 4,785,290 | A | * | 11/1988 | Goldman .................... 340/5.86 |
| 5,418,865 | A | | 5/1995 | Bloomberg .................. 382/312 |
| 5,434,917 | A | | 7/1995 | Naccache ...................... 380/23 |
| 6,226,619 | B1 | * | 5/2001 | Halperin et al. ................ 705/1 |
| 6,354,506 | B1 | * | 3/2002 | Han et al. ................... 235/487 |
| 6,472,976 | B1 | * | 10/2002 | Wohl ....................... 340/10.41 |
| 6,532,080 | B1 | * | 3/2003 | Kinjo ......................... 358/1.15 |
| 2003/0170604 | A1 | | 9/2003 | Mullen ........................ 434/317 |
| 2004/0044956 | A1 | | 3/2004 | Huang .......................... 715/511 |
| 2004/0074973 | A1 | * | 4/2004 | Schneck et al. ............. 235/488 |
| 2004/0099743 | A1 | | 5/2004 | Waters ........................ 235/491 |
| 2004/0100358 | A1 | | 5/2004 | Waters et al. ................. 340/5.1 |

(Continued)

FOREIGN PATENT DOCUMENTS

EP     1 398 711 A1     3/2004

(Continued)

OTHER PUBLICATIONS http://www.m-w.com/dictionary/strap, p. 1.*

(Continued)

*Primary Examiner*—Tung S Lau

(57) ABSTRACT

A physical object includes a base medium, such as a paper sheet, and a memory tag embedded in it or attached to it. The memory tag stores at least one measure/location data pair including a measurement of a location-dependent characteristic of the base medium originally associated with the tag, and a location in or on the object where the measurement was made. Preferably the measure/location data pair is digitally signed and stored in encrypted form. By checking whether the measure included in the stored data pair matches a current measure of the base medium at the indicated location, it is possible to check whether the base medium is the original medium. Apparatus is provided for originally writing the data pair to the memory tag; apparatus is also provided for subsequendy using the data pair for carrying out the checking operation.

10 Claims, 7 Drawing Sheets

U.S. PATENT DOCUMENTS

| | | | |
|---|---|---|---|
| 2004/0230887 A1 | 11/2004 | Sellen et al. | 715/500.1 |
| 2005/0058483 A1 | 3/2005 | Chapman et al. | 400/76 |

FOREIGN PATENT DOCUMENTS

| | | |
|---|---|---|
| JP | 08-221536 | 8/1996 |
| JP | 11-031209 | 2/1999 |
| JP | 2000-339418 | 12/2000 |
| WO | 82/00062 | 1/1982 |
| WO | WO-00/34923 | 6/2000 |

OTHER PUBLICATIONS

Ari Juels and Ravikanth Pappu, Squealing Euros: Privacy Protection in RFID-Enabled Banknotes, R.N. Wright, Springer-Verlag Berlin Heidelberg 2003, p. 103-121.*

Utilizing RFID Signaling Scheme for Localization of Stationary Objects and Speed Estimation of Mobile Objects, 2007 IEEE International Conference on RFID, Gaylord Texan Resort, Grapevine, TX, USA, Mar. 26-28, 2007, p. 94-99.*

JP11-31209 English translation, Imai Susumu and Nakamura, Takashi (JP 11-31209, Pub. Feb. 2, 1999), p. 1-13.*

Finkenzeller, K., "Fundamental Operating Principles," *RFID Handbook: Fundamentals and Applications in Contactless Smart Cards and Identification*, Ch. 3, 31 pages (2003), p. 29-59.

*Texas Instruments Registration and Identification System General Reference Manual*, Texas Instruments, 32 pages (Oct. 4, 1999), p. 1-32.

* cited by examiner

US 7,734,446 B2

PHYSICAL OBJECT WITH MEMORY TAG AND APPARATUS FOR USE WITH SUCH OBJECTS

FIELD OF THE INVENTION

The present invention relates to a physical object with a memory tag embedded in or attached to it, and to apparatus for use with such objects; more particularly, the present invention relates to verifying the association between the object and tag.

BACKGROUND OF THE INVENTION

Memory tags in the form of Radio Frequency Identification (RFID) tags are well known in the prior art. RFID tags come in many forms but all comprise an integrated circuit on which in use information can be stored and a coil which enables it to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. This chip is capable of both being read and being written to. In addition Hitachi has developed a memory tag they call a "mu-chip" which is a chip of 0.4 mm square and operates at 2.45 GHz. This chip is written with data during the manufacturing process in Read-Only-Memory (ROM), but is small enough to be embedded in paper.

SUMMARY OF THE INVENTION

According to one aspect of the present invention there is provided a physical object comprising a base medium with a memory tag embedded in it or attached to it, the memory tag storing at least one measure/location data pair comprising a measurement of a location-dependent characteristic of the base medium, and a location in or on the object where the measurement was made.

Preferably, the measured characteristic is one that varies with location in a random manner.

According to another aspect of the present invention, there is provided apparatus comprising:
 a memory-tag write device for writing to a memory tag that is embedded in or attached to a base medium of an object presented to the apparatus or that is to be so embedded or attached;
 a sensor arrangement sensor for measuring a characteristic of the object's base medium at a known location; and
 a processing arrangement for causing a measure/location data pair comprising a measurement taken by the sensor arrangement and the location at which this measurement was made, to be written by the memory-tag write device to the memory tag.

According to a further aspect of the present invention, there is provided apparatus comprising:
 a memory-tag read device for reading a measure/location data pair from a memory tag embedded in or attached to a base medium of an object presented to the apparatus, this data pair comprising a purported prior measurement of a characteristic of the base medium, and the location on the base medium where this measurement was made;
 a sensor arrangement for measuring a characteristic of the object base medium at a specified location; and
 a processing arrangement comprising comparison means for comparing the characteristic measurement in the measure/location data pair read from the tag with a measure made by the sensor when positioned at the location in the read data pair whereby to determine whether the base medium of the object presented to the apparatus is the same as that represented by the measure/location pair stored in the memory tag.

BRIEF DESCRIPTION OF THE DRAWINGS

Embodiments of the invention will now be described, by way of non-limiting example only, with reference to the accompanying drawings, in which.

DETAILED DESCRIPTION OF THE PREFERRED EMBODIMENTS

Figure 1:
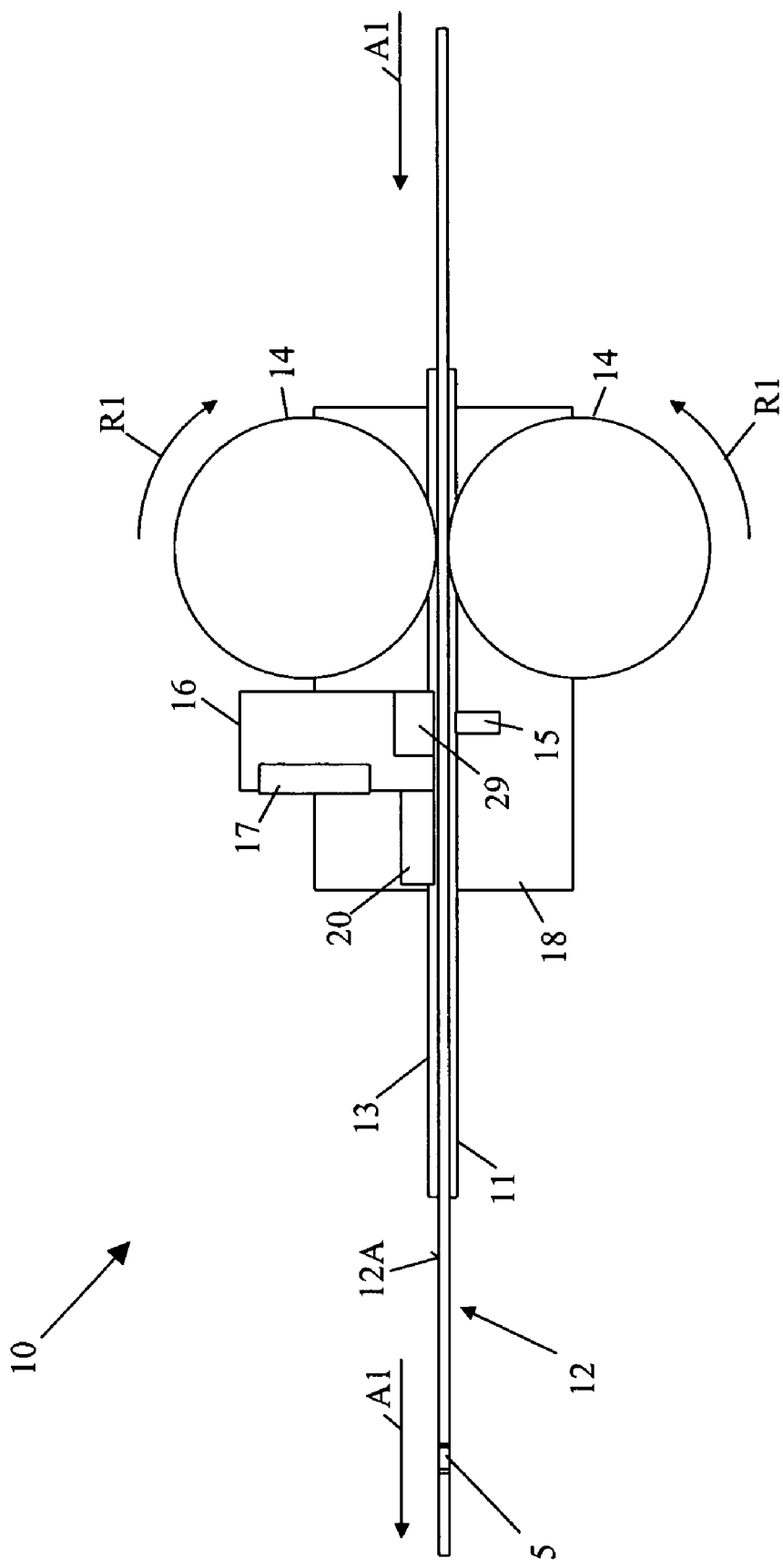
FIG. 1 is a diagrammatic side view of printer apparatus provided with a memory tag read/write device.
Figure 2:
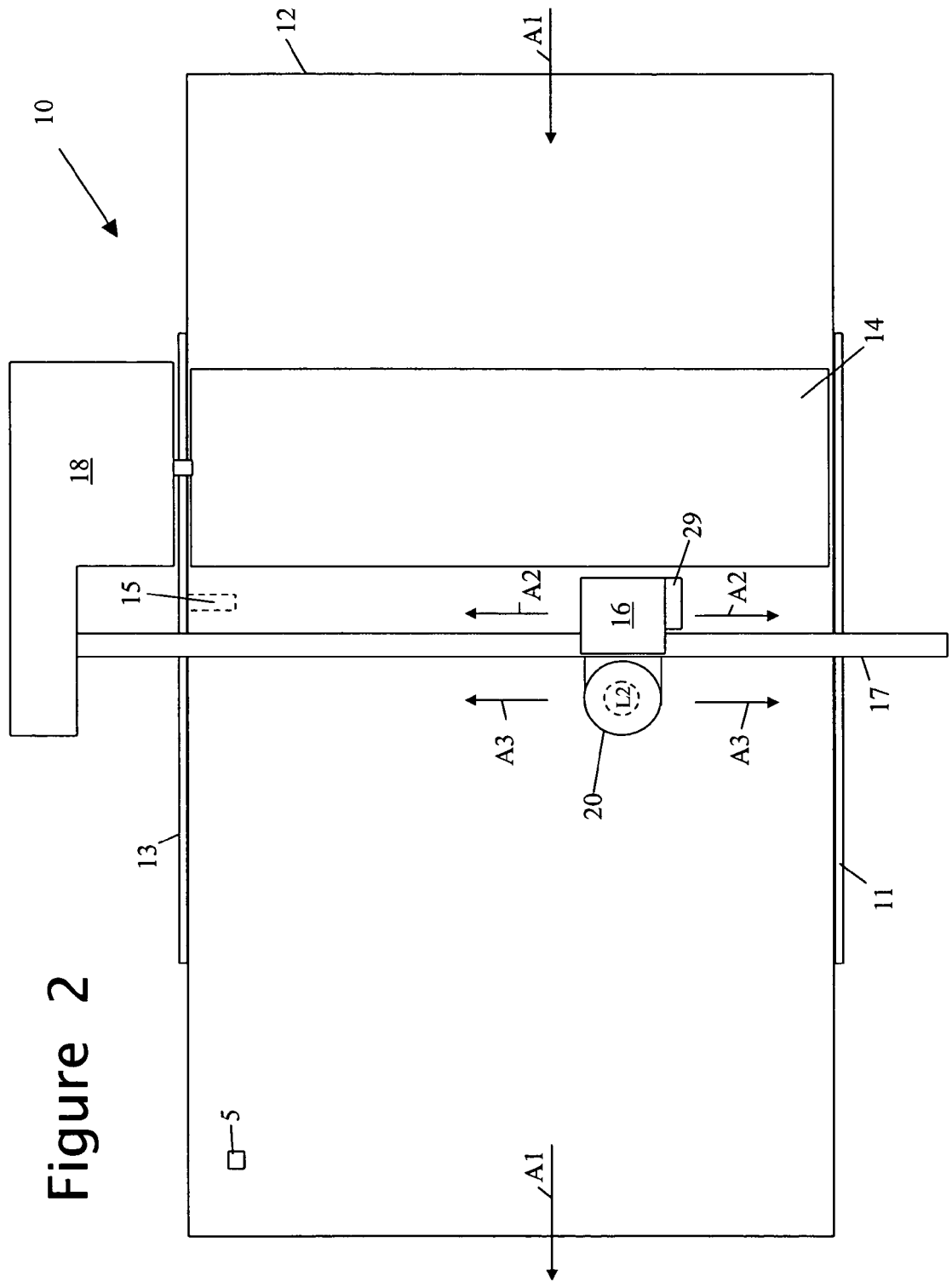
FIG. 2 is a diagrammatic plan view of the FIG. 1 apparatus.

Referring to FIGS. 1 and 2, apparatus 10 for printing onto a base medium and data writing to one or more memory tags in or on the base medium is illustrated. In the present example, the base medium takes the form of loose sheets 12, such as paper sheets, to which one or more memory tags 5 have been applied or within which one or more memory tags 5 have been embedded (in FIG. 1, a single memory tag 5 is depicted as embedded in the sheet 12). The memory tag or tags 5 are RFID memory tags for which the manner of writing data to the tags and reading data from the tags is well known (see for example the RFID Handbook, Klaus Finkenzeller, 1999, John Wiley & Sons). For simplicity only those parts of the apparatus 10 which need to be shown to describe the invention are illustrated and described. It will be understood that the apparatus 10 includes much known technology from the prior art of printers, and from the prior art of RFID memory tags, which is not described here.

The apparatus 10 comprises a platen 11 and paper feed rollers 14 which are driven, by drive mechanism 18, to rotate as indicated by arrows R1 to feed the sheets 12 across the platen 11 along a first axis in the direction indicated by arrows A1. The platen has an upstanding reference edge 13 for locating one edge of the sheet 12 as it is moved across the platen by the rollers 14. A leading edge sensor 15 embedded in the platen is arranged to sense the passing of the leading (and trailing) edges of the sheet 12.

The apparatus 10 further includes a print-head carriage 16 which carries a print head (not separately referenced) which in this example is of ink jet form. The print-head carriage 16 is mounted on a guide rail 17 which extends across the apparatus 10 substantially perpendicular to the axis A1. The print-head carriage 16 is moveable back and forth along the guide 17 in known manner by drive mechanism 18. Thus the print head is moveable back and forth along a second axis indicated by arrows A2, substantially perpendicular to the axis A1, to enable the print head to access most of the upper surface 12A of the paper sheet 12 as it moves through the apparatus 10, and thus to print anywhere on that accessible area of surface 12A as required.

The print-head carriage 16 also mounts a memory tag read/write device 20, and a paper-characteristic sensor 29. The paper-characteristic sensor 29 is used to measure a characteristic of the paper sheet 12 at a specified location on the sheet in order to provide a unique identifier of the particular sheet 12 concerned. As regards the nature of the measured characteristic, a number of possibilities exist, including, without limitation:

- a point value, measured at the specified location of the base medium, of a property such as an electrical, magnetic, optical or chemical property;
- a limited set of point values, taken at predetermined offsets from the specified location of the base medium, of a property such as an electrical, magnetic, optical or chemical property;
- an area-based property such as:
  - a map of the absolute values of a measured property of the base medium around the specified location;
  - a map of the variation in values of a measured property of the base medium in an area around the specified location (and, in particular, the pattern of these variations rather than the absolute size of these variations);
  - the pattern, or count, of fibres of the base medium where the latter is a fibrous medium such as a paper sheet;
  - the pattern formed by identifiable particles randomly dispersed in the base medium (such as reflective or magnetic particles) or a count of such particles;
  - a combination of any one or more of the foregoing.

Whilst the measured characteristic is preferably one that varies with location in random manner, this is not essential in all cases particularly where the pattern of variation, even though non random, is complex and the economic returns of a successful forgery are not high.

The memory tag read/write device 20 operates to write data to and/or read data from memory tags 5 as required using an inductive coil L2. Due to its mounting on the carriage 16, the inductive coil L2 of the memory tag read/write device 20 is moveable back and forth along a third axis indicated by arrows A3, substantially perpendicular to the axis A1, and parallel to the axis A2, to enable the memory tag read/write device 20 to read data from and/or write data to memory tags 5 located anywhere on or in the accessible area of the sheet 12.

Figure 3:
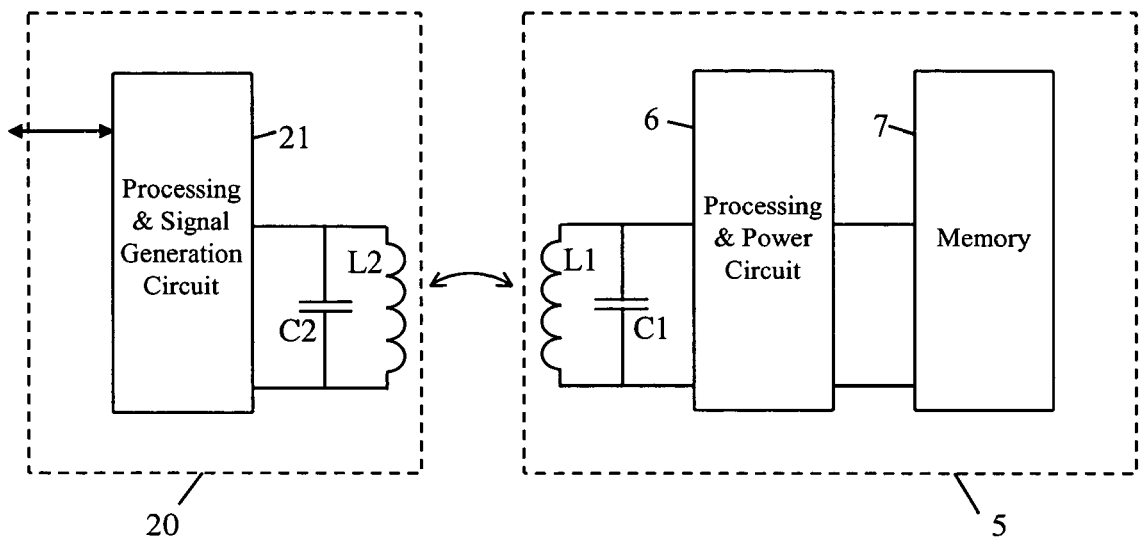
FIG. 3 is a diagram of a memory tag and the read/write device of the FIG. 1 apparatus.

Referring now to FIG. 3, the basic operation of a memory tag 5 and of the read/write device 20 will be described. A memory tag 5 includes an antenna coil L1 and a capacitor C1 connected in parallel therewith to form a resonant circuit. The tag 5 further includes a memory 7 and processing and power circuitry 6. The read/write device 20 includes an antenna coil L2 and a capacitor C2 in parallel therewith to form a resonant circuit, and a processing and signal generating circuitry 21.

A signal generator within circuitry 21 generates a signal at the chosen frequency, such as 2.45 GHz; this signal is applied to the antenna coil L2 and thus generates an electro-magnetic field which, provided the memory tag 5 is sufficiently close to the read/write device 20, penetrates the antenna coil L1 of the memory tag 5. By induction a voltage is thus generated in the antenna coil L1. This induced voltage is rectified in circuitry 6 and used to power the memory tag 5. The capacitance of the capacitors C1 and C2 is selected such that the resonant circuits are both resonant at the frequency generated by the signal generator, in order to maximise transmitted signal strength and received signal.

When data is to be written to the memory tag 5 by the read/write device 20 the radio frequency signal generated in circuitry 21 is modulated, e.g. amplitude modulated, with the data before being applied to the antenna coil L2 and transmitted. The signal received by the memory tag 5 by inductive coupling thus both powers the memory tag 5 and communicates with it, the circuitry 6 separating the data signal from the carrier and passing data for storage to the memory 7.

Similarly, if data is to be read from the memory tag 5 the circuitry 6 applies a signal indicative of the data to the antenna coil L1 which is detected, as a result of the inductive coupling, by antenna coil L2 and deciphered in circuitry 21 before being output from the read/write device 20. This signal may for example be transmitted using load modulation. In RFID systems such as this the power consumed by the memory tag 5 can be measured as a drop in voltage across the internal resistance of the antenna coil L2 of the read/write device 20. A load resistance within the circuitry 6 may be switched on and off, thus altering the power consumed by the memory tag 5 which is then detected as an amplitude modulation of the voltage across the antenna coil L2 of the read/write device 20.

Figure 4:
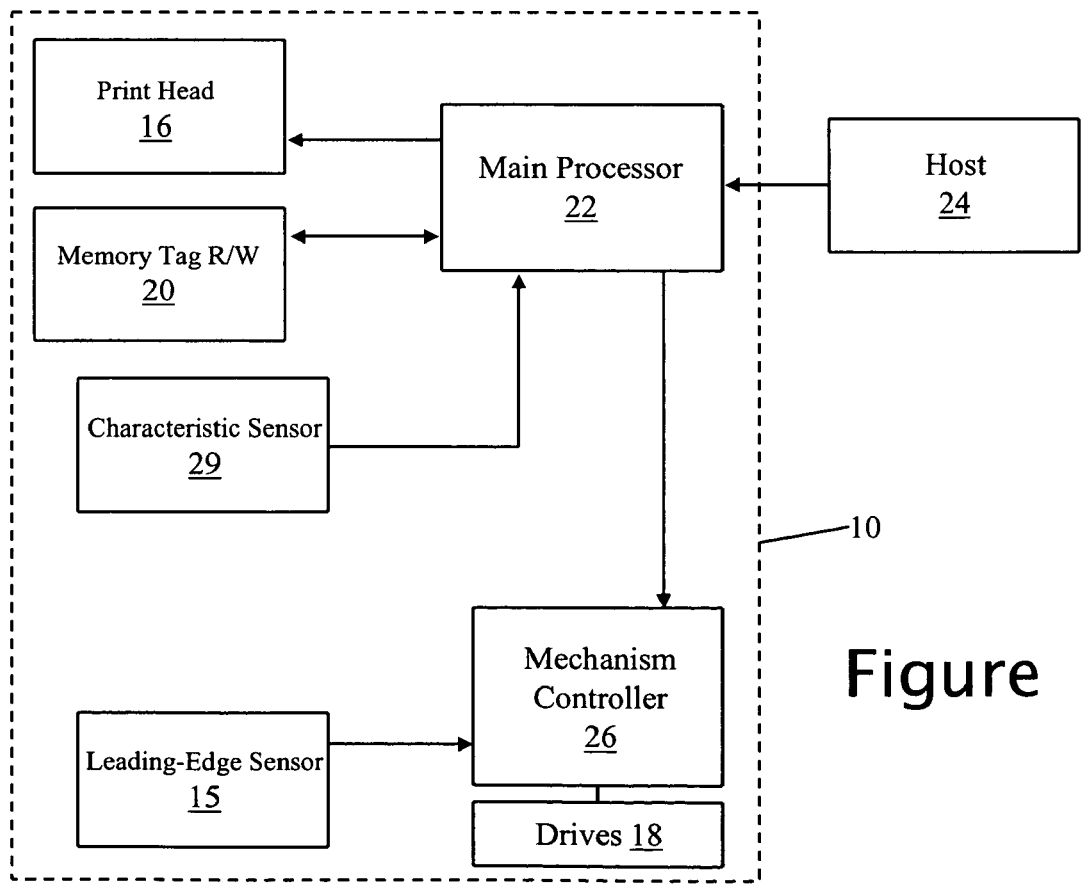
FIG. 4 is a block diagram of the functional components of the FIG. 1 apparatus.

Returning to a consideration of the printer apparatus 10 as a whole, FIG. 4 shows the main functional components in block diagram form. In addition to the components already described (namely, print head 16, memory tag read/write device 20, sensors 15 and 29, and drive mechanism 18), the apparatus includes a main processor 22, typically a program-controlled processor, arranged to receive input from an external device (such as a host computer 24), and a mechanism controller 26 for controlling the drive mechanism 18 to move the paper sheet 12 and the print-head carriage 16 as commanded by the main processor 22.

The mechanism controller 26 is arranged to position the print head over the sheet 12 at a position specified by the main processor 22 in standard units (such as millimeters) relative to a frame of reference established by the edges of the sheet (in particular, the sheet edge up against the reference edge 13 and the sheet leading edge as detected by sensor 15). As will be understood by persons skilled in the art, this is achieved by providing for the conversion of the units of measure provided by the processor 22 into the basic positioning units, such as stepping motor increments, used by the drive mechanism 18. This conversion utilises both scaling factors between standard measurement units and drive-mechanism units, and offset values. These offset values comprise a fixed offset value between the reference edge 13 and the drive mechanism position measure in the direction of axis A2 when the print head is aligned with the edge 13, and the value of the drive mechanism position measure in the direction of axis A1 when the sensor 15 detects the leading edge of the sheet 12.

In addition to responding to commands from the processor 22 to position the print head at a particular position over the sheet 12 relative to the sheet-edge frame of reference, the mechanism controller 26 is also arranged to respond to commands from the processor 22 to position either one of the memory tag read/write device 20 and the paper-characteristic sensor 29 at a specified position above the sheet 12 relative to the sheet-edge frame of reference (it being appreciated that this simply involves the controller 26 positioning the print head at a position offset relative to specified position by an amount corresponding to the actual offset, relative to the print head, of the element 20/29 being positioned).

The main processor 22 receives data and instruction signals from the host computer 24, including:
 the print data items (text, images etc) to be printed;
 where to print these print data items (alternatively, the processor 22 may determine printing locations itself based on what print data items it receives); and
 generic data such as author and date.

The main processor 22 sends command signals as required to:
 the mechanism controller 26;
 the print head 16; and
 the memory tag read/write device 20, to print the print data items where required and to write the print data items, the meta data items and the generic data to the memory tag or tags 5. The processor 22 also causes the read/write device 20 to write location data and sheet characteristic data to the tag(s) 5 as will be more fully explained below.

Thus the sheet 12 is fed through the apparatus 10 and has the required information printed on its upper surface 12A. At the same time the memory tag or tags 5 on or within the paper sheet 12 have the necessary data written to them by the memory tag read/write device 20, with the movement of the memory tag read/write device 20 (and print head 16) being paused with the memory tag read/write device 20 over the or each memory tag 5 as necessary for the data writing to take place.

The manner of co-ordination of the printing and data writing processes will depend on a number of factors. If, for example, the memory tag or tags 5 are only present adjacent the top and/or bottom of the paper sheet 12 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 12.

To facilitate reading of the memory tag or tags 5 by hand held readers, the or each memory tag 5 can have an icon printed over its locations which can be readily identified by users.

The memory tag read/write device 20 may, in addition to writing the data to the memory tag or tags 5, also conduct a read operation to check that the data has written successfully before the paper sheet 12 is moved on following the data write operation. Alternatively, particularly if the apparatus 10 is operating at high speed, a separate data check device (not shown) may be included in the apparatus such that this operation takes place downstream of a memory tag write device which in this case need not also be capable of data reading.

Figure 5:
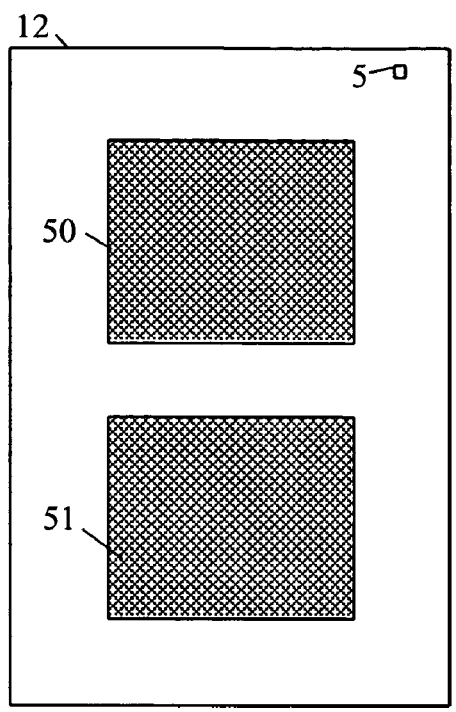
FIG. 5 depicts a sheet printed and written to by the FIG. 1 apparatus, the sheet being provided with a single memory tag.

FIG. 5 depicts an example sheet 12 printed and written to by the apparatus. The FIG. 5 sheet 12 has two images 50 and 51 printed on it and a single memory tag 5 to which the corresponding print data items have been written.

Figure 6:
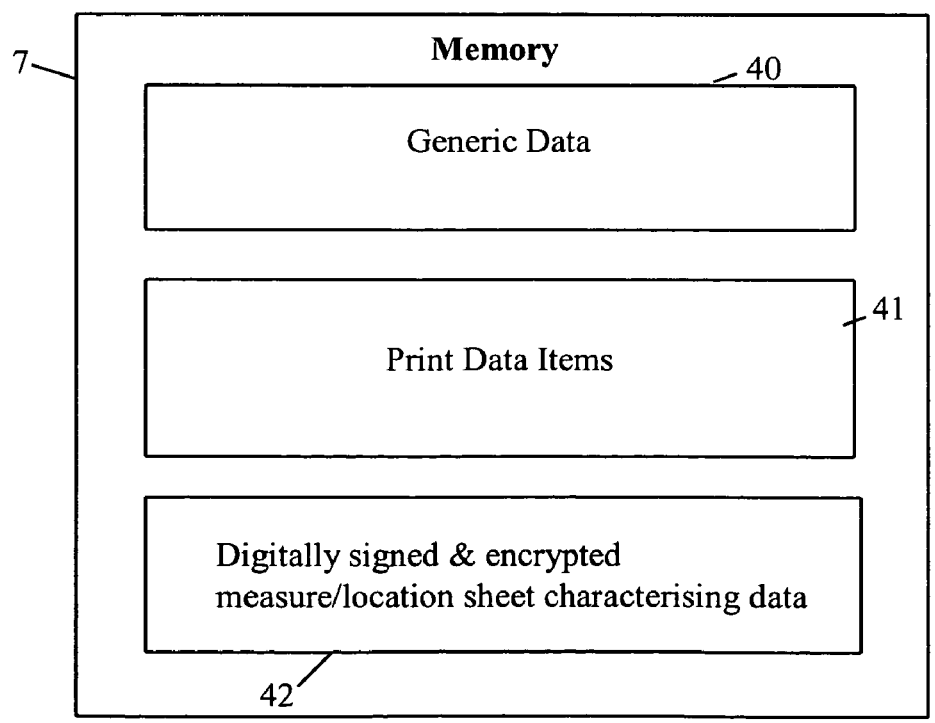
FIG. 6 is a diagrammatic representation of the contents of a memory tag after being written to by the FIG. 1 apparatus.

FIG. 6 depicts the typical contents of the memory 7 of a memory tag 5 after it has been written to by the memory tag read/write device 20. In this example, the contents of the memory 7 is divided into three data blocks 40 to 42.

The data block 40 comprises the generic data provided by the host computer 24 and may additionally include data such as a read-only unique reference ID for the tag itself, tag compatibility information, and manufacturing details.

The data block 41 comprises the print data items provided by the host computer 24.

The data block 42 comprises a sheet characteristic measure (s) as taken by the sensor 29 when positioned at a random location specified by the processor 22; the sheet-edge referenced coordinates of this location are also included in block 42. In cases where the sheet characteristic is only discernible by sensor 29 on unprinted areas of the sheet 12, the specified random location must lie outside a printed (or to be printed) area of the sheet; in other cases, the random location can be located anywhere on the sheet. Generally, the characteristic measure is taken either immediately before or after printing has been effected, the processor 22 commanding the controller 26 to position the sensor 29 at a specified random location with the measure taken by the sensor at this location then being passed from the sensor 29 to the processor 22 for subsequent writing, along with the associated location, to at least one memory tag 5. The data pair comprising the measure and associated location are preferably digitally signed (either by processor 22 or host 24) using the private key of a public/private key pair of a signing party, such as the party initiating printing to the sheet; the digital signature is also included in block 42. This signature effectively serves as an assurance by the signing party that the memory tag concerned is specifically associated with the particular instance of sheet 12 that exhibits the same characteristic measure at the same location as indicated by data block 42. Such a specific association of tag and sheet can be used directly to imply something about the sheet concerned—for example, the signing party may only provide such a digitally-signed measure/location data pair for the first n sheets on which an artistic or literary work of the signing party has been printed; in this scenario, the value of n could be 1, effectively creating an "original" sheet (this could be useful in a number of contexts, including in respect of legal documents). Rather than the aforesaid specific association of tag and sheet being used to imply something about the sheet concerned, the "something" can be an attribute explicitly set out in data block 42 and covered by the digital signature (for example, this attribute could be the entitlement of the possessor of the sheet 12 to a prize of a specific value).

In fact, the digital signature could be extended to cover other data held in the memory 7—for example, the signature could extend to cover at least the print data items stored to the memory tag whereby to serve as an assurance that at least part of what is printed on the sheet 12 corresponds to the stored print data items.

Advantageously, one or both elements of the measure/location data pair of block 42 is encrypted so that it is only readable by authorised parties. This reduces the possibility of anyone creating a forgery by creating a different sheet 12 with the same sheet characteristics at the specified location as the sheet for which the digitally-signed measure/location data was generated. Where a digital signature is provided and covers both the measure/location data pair and additional data not subject to encryption (such as a specific attribute to be imputed to the sheet 12), the signature is preferably effected over the unencrypted additional data and the encrypted measure/location data pair (rather than the unencrypted data pair) as this enables signature-based authentication to be carried out by parties regardless of whether they can decrypt the measure/location data pair, thereby enabling the authenticity of the additional data to be checked by all parties. Of course, where the additional data is an attribute to be imputed to the sheet, valid imputation of this attribute depends on the stored encrypted measure/location pair being decrypted and checked against the sheet 12.

Figure 7:
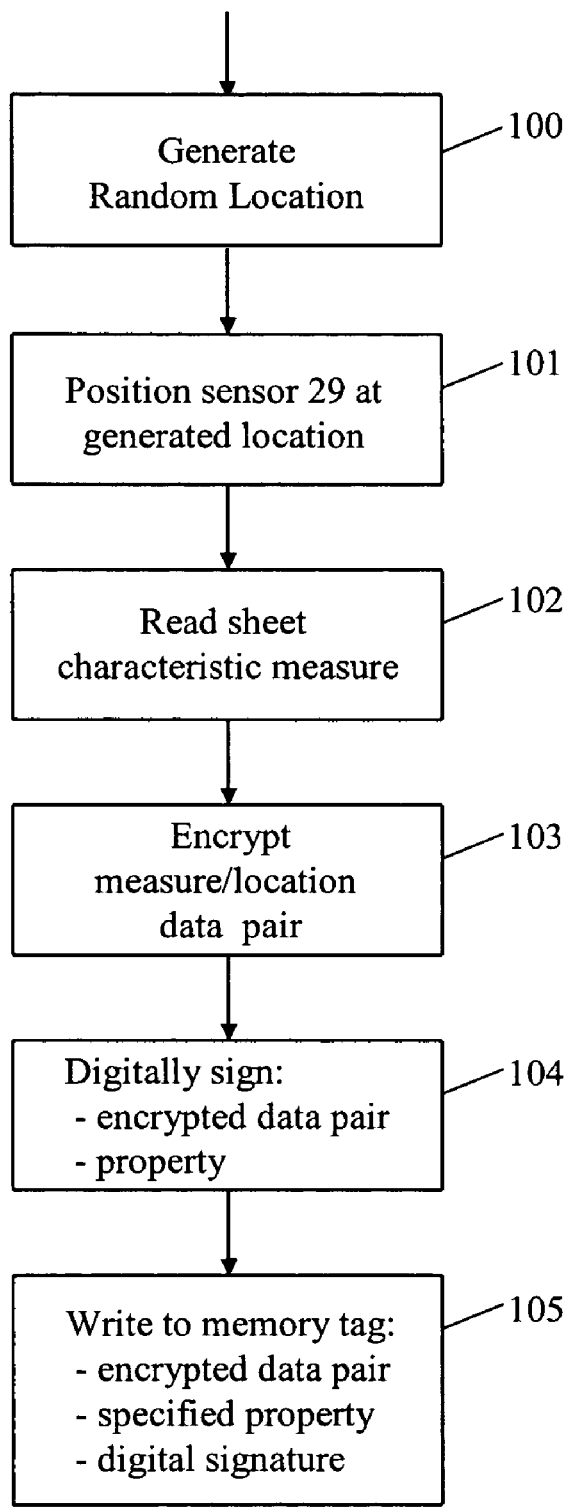
FIG. 7 is a flow chart of the steps carried out by the FIG. 1 apparatus in deriving and writing sheet characteristic data to a memory tag of a sheet.

FIG. 7 is a flow chart of the steps carried out by the processor 22 in the preferred process for generating and writing the data block 42. Thus, in step 100 the processor generates a random sheet location. In step 101 the processor 22 causes the sensor 29 to be positioned above the generated random location. In step 102, the sheet characteristic measure at the generated random location is read off. In step 103, the data pair formed by the measure and location are encrypted. In step 104, a digital signature is formed over the encrypted measure/location data pair and an attribute to be imputed to the sheet 12. In step 105, the encrypted data pair, the attribute data, and the digital signature are written as the data block 42 of the or each memory tag.

Once the sheet has been printed and written to as described above, it can be used in a variety of ways. By way of example, it will be assumed that the sheet 12 is provided to a person with access to the same or a different instance of the apparatus 10. Thus the sheet 12 can be fed into the apparatus 10 set in "read" mode to cause the read/write device to be scanned over the sheet to locate the or each memory tag 5 and read its contents into a memory portion of the main processor 22 of the apparatus 10. The data can then be passed to the host computer 24; since this data includes an electronic version of the printed matter on the sheet of paper 12, the computer 24 can command the apparatus 10 to produce one or more copies of the original printed data without the need to scan the sheet 12, and hence such copies should be free from the kinds of errors that may be generated by scanning. This may be of particular use where the printed matter is a photograph, which over a period of time may fade, or otherwise deteriorate, such that it cannot be copied adequately by conventional techniques. Furthermore, a print data item read from a tag 5 and sent to the host computer 24 can be altered in some way (for example, by text editing where the print data item is word processed text, or by digital manipulation where the print data item is a digital photograph), the altered data item then being sent back to the apparatus 10 to be printed (and possibly also stored in another memory tag 5 in its altered form).

Figure 8:
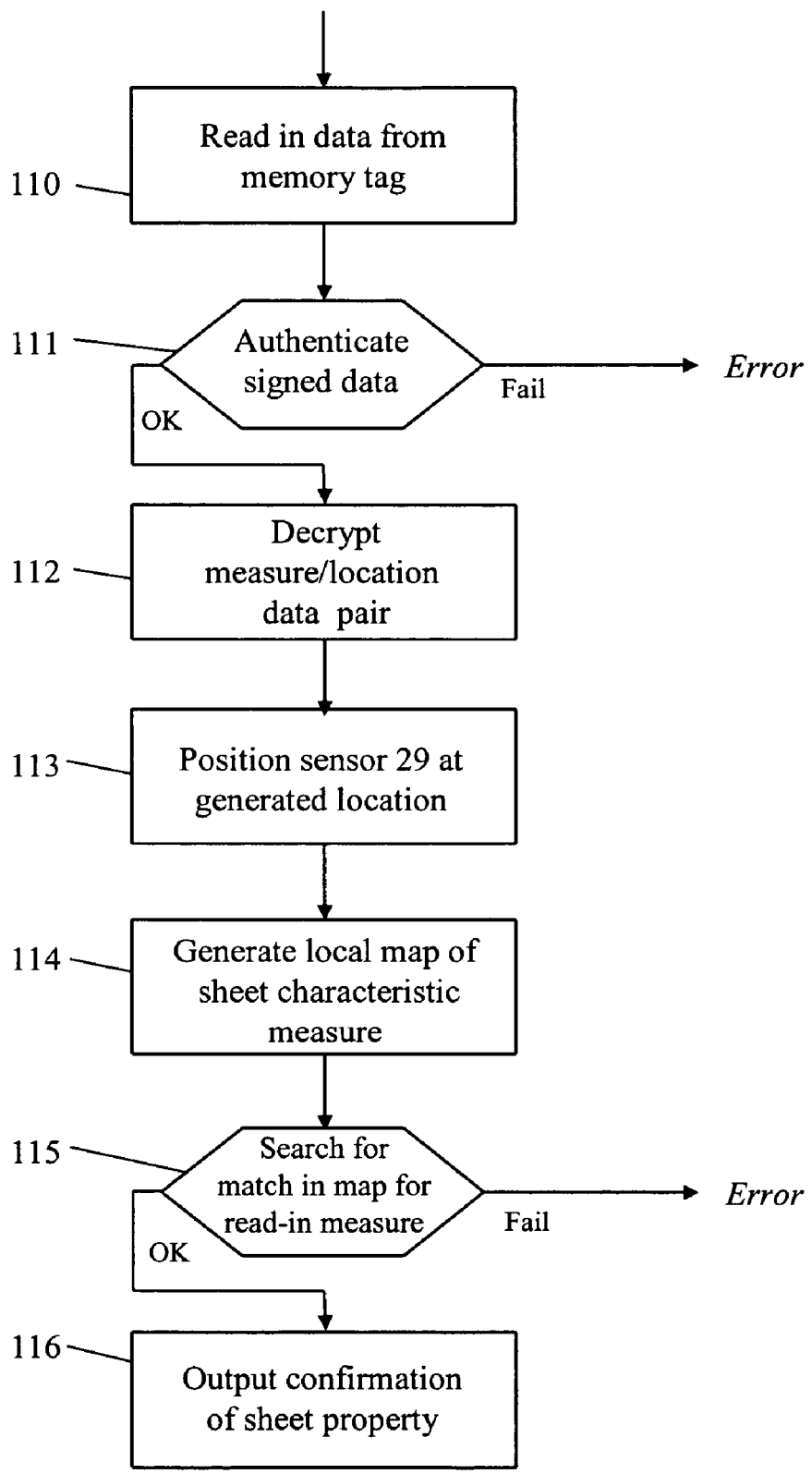
FIG. 8 is a flow chart of the steps carried out by the FIG. 1 apparatus in using the sheet characteristic data stored in a sheet memory tag to check the association between the tag and sheet.

Since, as indicated above, it is relatively easy to produce copies of the sheet 12 that are of the same print quality as the original and hold the same data in memory tag(s) 5, there arises the question of whether it is possible to identify the "original" of the sheet 12. Of course, in many cases, this will not be a relevant issue; however, where it is of relevance, the data block 42 serves to provide a way of identifying the original sheet 12 (or, indeed, some other attribute of the sheet 12) by providing a way to check the association of the memory tag 5 with the particular instance of the sheet 12 carrying the tag, whereby to validate the inheritance of some attribute specified in the tag or implied by its presence. FIG. 8 depicts the steps carried by processor 22 in checking this association for the case of a sheet 12 to which measure/location data has previously been written in accordance with the process of FIG. 7. According to the FIG. 8 process, the processor 22 is arranged to read in the data block 42 (step 110) and then to authenticate (step 111) the signed data (in this example, the encrypted measure/location data and the attribute data) by using the digital signature associated with this data; this verification is accompanied by a check of the identity of the owner of the public key used for the signature. If this authenticity check is failed an error message is generated. However, if the authenticity of the measure/location data is confirmed, the processor 22 next proceeds to decrypt (step 112) the data using a decryption key supplied, for example, by the person presenting the sheet 12; this key will typically be input to the apparatus via the host computer 24 or via an input device connected directly to the apparatus 10. Next, the processor 22 commands the controller 26 to position the sheet-characteristic sensor 29 over the sheet location indicated by the decrypted location (step 113). The output of the sensor 29 is then read (step 114) and compared with the decrypted measure of data block 42 (step 115). If no match is found, an error message is output. However, if a match is found, the processor generates an output confirming that the memory tag 5 is correctly associated with the sheet 12 and can validly be imputed the attribute (such as "original" status) specified by data included in the data block 42.

Of course, in practice it will not be possible to guarantee that the sensor 29 of a different (or, indeed, the same) apparatus 10 will consistently be positioned over exactly the same spot on the sheet 12 in response to the controller 26 being commanded to move the sensor 29 to the same particular location. Mechanical tolerances, wear and other factors will mean that there will be some degree of positioning inaccuracy. For this reason, when the processor 22 wishes to check the characteristic measure, it controls the positioning of the sensor 29 to examine an area of the sheet centred on the specified location but of an extent to encompass all points (or, in the cases where the measured characteristic is area based, all areas) where the original stored measure might have been taken having regard to the maximum expected positioning inaccuracy. The processor 22 can be arranged to carry out a real-time matching process between the measured characteristic and the stored measure as the sensor 29 moves over the area under examination; alternatively, the processor 22 can be arranged to produce (at step 114) a map of the measured characteristic across the area under examination with the processor 22 subsequently seeking for a match (at step 115) between the measure from data block 42 and any part of the map. The specifics of the foregoing process will depend on the nature of the characteristic measure—for example, where the measure is the pattern of fibres of the base medium of the sheet or of particles randomly dispersed in the base medium, then the examined area is simply a larger pattern area and standard pattern matching techniques can be used to search for a match. Where the characteristic measure is a point measure of some property, then the sensor 29 will measure the variation of the measured property in the examined area and the processor will look for a match using the measured values (and possibly also interpolated values); to enable values to be interpolated between sample measures, the property concerned should be one that varies in a continuous manner, albeit randomly.

It would alternatively be possible for the original stored measure to be replaced by a characteristic map recording measures within the locality of the specified location, this measure being included in the data block 42; subsequent checks would then be carried out by taking a measure at the specified location and then seeking to match this measure with a part of the stored map. A further alternative would be to store a characteristic map for an area that, by itself, is less than that needed to handle the permitted positioning tolerances; subsequent measures are then taken over an area in the locality of the stored location and of an extent that it will overlap the stored map for the permitted positioning tolerances; in this case, the processor 22 is arranged to seek a match of any part of the stored characteristic map with any part of the subsequently-examined area. It will be appreciated that in this latter alternative, the characteristic measure resulting in a match may not be positioned precisely at the stored location but in its vicinity.

It will also be appreciated that multiple measure/location data pairs can be derived and stored in a memory tag for a given sheet 12 with subsequent checks being carried out in respect of one, some or all these measure/location data pairs. In this case, the processor is arranged to confirm that the tag and sheet are correctly associated when either all, or a only threshold subset, of the stored measures are matched by the measurements made by the sensor 29.

Many variations are, of course, possible to the above-described apparatus. For example, the inductive coil L2 of the memory tag read/write device 20 can be incorporated into the print head itself; in this case, the axes A2 and A3 will be coincident. Although the print head 16 is described as being of ink jet form, other forms of print head, and indeed other forms of printer, can be used. For some forms of printer it may be appropriate for the memory tag read/write device 20 to be moveable independently of the print head 16 rather than these units being connected together for movement as one. In this alternative embodiment of apparatus, the memory tag read/write device 20 is mounted on a read/write device carriage for independent movement along the axis A3, this carriage being located either upstream or downstream of the print head carriage 18; the mechanism controller 26 is arranged to position the read/write device carriage relative to the frame of reference established by the edges of the sheet 12 in the same manner as described above for the print-head carriage. In other forms of the printer, the print head 16 spans the width of the sheet 12 and does not move side to side in order to achieve the necessary print coverage. This form of printer therefore does not include a print carriage. This embodiment might involve laser printers, and other forms of printing technology, in which the print heads are fixed within the apparatus and do not move relative to the base medium or other wise. A memory-tag read/write device carriage would, however, still be provided and the sensor 29 would be mounted on this carriage.

As an alternative to the sheet-characteristic sensor 29 being mounted on the carriage used for the print head and/or the memory-tag read/write device, it can be independently mounted on its own carriage. In this case, the sensor 29 and its mounting carriage can be arranged to measure a sheet characteristic by accessing the underside of the sheet 12—this can be advantageous as it avoids problems that may be caused by the print effected by print head interfering with measurement of the sheet characteristic. With this arrangement, the mechanism controller 26 is arranged to position the sensor carriage relative to the frame of reference established by the edges of the sheet 12 in the same manner as described above for the print-head carriage.

Of course, other arrangements as possible for positioning the device 20 and/or sensor 29 at a desired location relative to the sheet 12. Thus, for example, instead of the sheet 12 and [device 20/sensor 29] being moveable in respective orthogonal directions as in the apparatus of FIGS. 1 and 2, means can be provided to displace one of the sheet 12 and [device 20/sensor 29] in two orthogonal directions whilst the other of the sheet 12 and [device 20/sensor 29] is kept stationary.

Rather than using the edges of the sheet for establishing a frame of reference for positioning elements of the apparatus 10 (in particular, the print head 16 and/or the read/write device 20, and/or the sensor 29) over the sheet 12, other frames of reference can be used. For example, it would be possible to print the sheet with a positioning grid or pattern that is readable by a suitable sensor mounted on the or each element-mounting carriage; suitable positioning patterns are well known in the art (see, for example, WO-A-01/26032, Anoto AB). The positioning pattern could be provided preprinted on the sheet 12 or could be printed by the print head 16 (though in this case it will typically still be necessary to use the sheet edges and the drive mechanism scaling factors to determine where to print the pattern). A further possibility for establishing a frame of reference for positioning is to use the location of a memory tag 5 embedded in, or attached to, the sheet 12 as the origin point of the frame of reference, the drive mechanism being calibrated to provide measures of displacement from this origin along axes defined by the mechanics of the apparatus and the orientation of the sheet. The sheet orientation will often be determined by the sheet edges abutting reference guides. However, since these edges could be damaged over time, it is preferable to provide some way of defining sheet orientation independently of the sheet edges. A number of ways of doing this are possible; for example, the sheet could initially be printed with markings defining axes (typically orthogonal axes) or the memory tag could be printed or physically formed with orientation markings that the apparatus could detect and use to orient the sheet 12 correspondingly. Alternatively, two or more memory tags could be positioned in or on the sheet such as to define sheet orientation, the apparatus again being arranged to orient the sheet 12 correspondingly or to computationally adjust for the orientation of the sheet.

Though in most embodiments the frame of reference used for sheet locations will not have its origin point coincident with the location of a memory tag, it is still possible for the location data stored by a memory tag to specify locations on the sheet relative to its own location. Thus, for example, the location data included in the measure/location data pair comprising the data block 42 of a memory tag can be specified relative to the location of the tag storing the data.

Rather than the memory tag(s) being embedded in, or attached to, the sheet 12 prior to the sheet being introduced into the apparatus, it is possible to arrange for the apparatus to have a supply of memory tags with the apparatus first writing data to a tag before adhering it to the corresponding sheet, typically after it has printed the latter.

Figure 9:
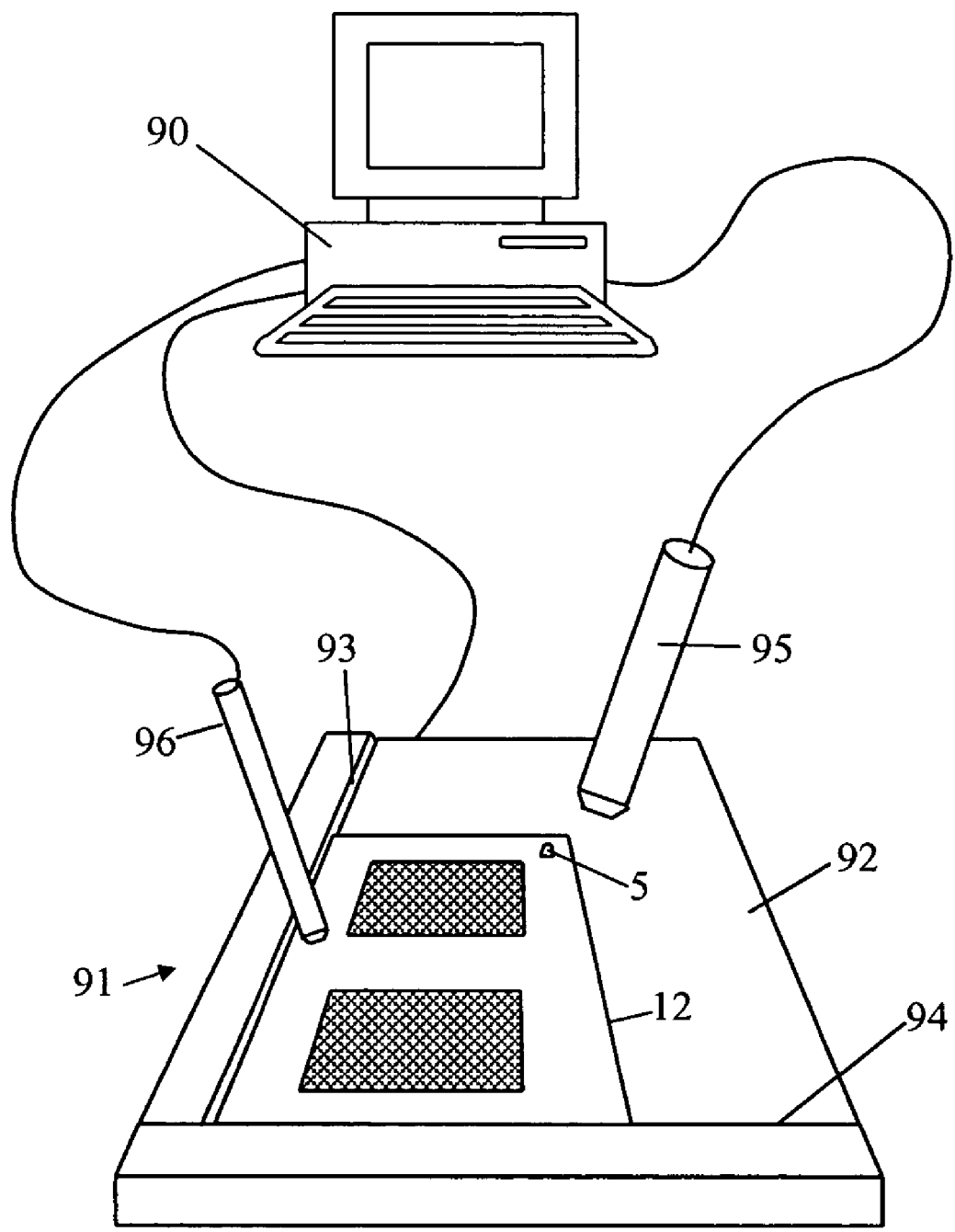
FIG. 9 illustrates an alternative arrangement for enabling a user to interact with a previously printed/written-to sheet.

Although the apparatus 10 has been described as being employed for reading a previously printed/written-to sheet 12, other arrangements are possible such as that illustrated in FIG. 9 in which a general purpose computer 90 (for example, a desktop or laptop computer) is connected to a graphics tablet 91, a hand-held memory-tag reader 95, and a hand-held sheet-characteristic sensor 96. The graphics tablet 91 is of standard form with a pressure sensitive surface 92 on which a printed sheet 12 (with memory spot 5) is placed up against positioning reference edges 93, 94. The reader 95 is used to read data from the memory tag 5 into the computer 90, including the data block 42 comprising the measure/location pair characteristic of the sheet 12 with which the tag 5 should be attached to/embedded in. This enables the location at which the sheet-characteristic measure was taken to be displayed by the computer 90. The user can then position the sheet-characteristic sensor 96 at this location and take a sheet characteristic measure (the positioning of the sensor at the required location is enabled by arranging for the current sensor position to be measured by the graphics tablet and displayed by the computer 90, the sensor 29 being such that it is correctly distanced for measuring the sheet characteristic concerned when pressed lightly against the sheet whereby the graphics tablet can sense its position). The measured sheet characteristic is then compared with that of data block 42 as described above in relation to the FIG. 8.

It will also be appreciated that the initial sheet-characteristic measurement and writing of a measure/location data pair to the memory tag(s) of the sheet can be effected by means other than the apparatus 10. For example, an arrangement similar to that of FIG. 9 can be used, such an arrangement employing a hand-held characteristic sensor, a graphics tablet, a hand-held memory tag writer, and a PC.

Furthermore, where the location for effecting characteristic measures can be specified independently of a knowledge of what items are to be printed on a sheet 12, the data to be written as data block 42 can be determined and written to the memory tag(s) in advance of the sheet being presented for printing. Indeed, where the sheet attribute being attested to by data block 42, concerns the base medium itself, the subsequent printing of the sheet may be superfluous and omitted if desired.

Whilst the measure/location data pair comprising the data block 42 is in the preferred embodiment described above both encrypted and digitally signed, in some circumstances it will not be necessary to do both. For example, if the measured characteristic (or, more likely, the spatial relationship of two or more measure/location data pairs) cannot for practical purposes be reproduced on a sheet, then it is not necessary to encrypt the measure/location data pair(s). Conversely, it will not be necessary to digitally sign the measure/location data where this data is encrypted by an authorised (and trusted) party and does not need to be authenticated independently of its decryption by the authorised party.

The above embodiments have been described as appropriate for use with loose sheets 12. However, embodiments can also be constructed for use with other base media, for example paper in fan fold or roll form, or indeed boxes or other objects (the term "base medium" in this context simply referring to the portion of the object not constituted by the memory tags). Whilst objects with substantial extent in three dimensions will be printed only on their surfaces, with appropriate technology (such as ultrasound scanner or a penetrating probe) it is possible for the characteristic measure to be taken at a location within the bulk of the object in which case the location of the measure must be specified in three dimensions relative to an object-based frame of reference.

In the above-described embodiments the memory tags 5 have all used RFID technology. However, it is also possible to use memory tags which operate at other frequencies, outside the radio frequency range.

The invention claimed is:

1. A physical object comprising a base medium for receiving an image, said base medium having a memory tag one of embedded in and attached to the base medium, the memory tag storing at least one measure/location data pair comprising a measurement of a location-dependent characteristic of the base medium, and a location in or on the object where the measurement was made, wherein said characteristic varies with said location in a random manner and said at least one data pair is stored in encrypted form and covered by a digital signature that is also stored in the tag.

2. A physical object according to claim 1, wherein the digital signature further covers attribute data indicative of an attribute to be imputed to the physical object, the attribute data also being stored in the tag.

3. A physical object according to claim 1, wherein the base medium is a fibrous material, the measured characteristic comprising the pattern formed by fibres of the base medium at the measurement location.

4. A physical object according to claim 1, wherein identifiable particles are dispersed in the base medium, the measured characteristic comprising the pattern formed by, or a count of, the particles at the measurement location.

5. A physical object according to claim 1, wherein the measured characteristic comprises the point value, at the measurement location, of an electrical, magnetic, optical or chemical property of the base medium.

6. A physical object according to claim 1, wherein the measured characteristic comprises a set of point values, taken at respective predetermined offsets relative to the measurement location, of an electrical, magnetic, optical or chemical property of the base medium.

7. A physical object according to claim 1, wherein the measured characteristic comprises a map of the absolute values of a property of the base medium taken over an area around the measurement location.

8. A physical object according to claim 1, wherein the measured characteristic comprises a map of the variations in absolute values of a property of the base medium taken over an area around the measurement location.

9. A physical object according to claim 1, wherein the measured characteristic is stored in the form of data indicative of values of the characteristic over a region around said location whereby to allow for positioning inaccuracies when subsequently trying the re-measure the characteristic at said location.

10. A physical object according to claim 1, wherein the memory tag is a radio frequency memory tag.

* * * * *